United States Patent [19]

McCoy

[11] Patent Number: 4,466,891

[45] Date of Patent: Aug. 21, 1984

[54] GLYCERYL ETHER SULFONATES FOR USE IN OIL RECOVERY FLUIDS AND PROCESSES

[75] Inventor: David R. McCoy, Austin, Tex.

[73] Assignee: Texaco Inc., White Plains, N.Y.

[21] Appl. No.: 394,584

[22] Filed: Jul. 2, 1982

[51] Int. Cl.³ .............................................. E21B 43/22
[52] U.S. Cl. ............................... 252/8.55 D; 166/275; 260/512 R; 260/513 R
[58] Field of Search .................. 252/8.55 D; 166/273, 166/274, 275; 260/512 R, 513 R

[56] References Cited

U.S. PATENT DOCUMENTS

| | | | |
|---|---|---|---|
| 2,233,381 | 2/1941 | DeGroote et al. | 252/8.55 |
| 3,228,979 | 1/1966 | Gaertner | 260/512 |
| 3,977,471 | 8/1976 | Gale et al. | 166/275 X |
| 4,018,278 | 4/1977 | Shupe | 252/8.55 |
| 4,077,471 | 3/1978 | Shupe et al. | 252/8.55 X |
| 4,110,229 | 8/1978 | Carlin et al. | 252/8.55 |
| 4,288,334 | 9/1981 | McCoy et al. | 252/8.55 |
| 4,293,428 | 10/1981 | Gale et al. | 252/8.55 |
| 4,299,711 | 11/1981 | Tyler et al. | 252/8.55 |

*Primary Examiner*—Herbert B. Guynn
*Attorney, Agent, or Firm*—Robert A. Kulason; Jack H. Park; Richard A. Morgan

[57] ABSTRACT

Petroleum may be recovered from petroleum containing formations having high salinity by injecting into the formation an aqueous fluid containing an effective amount of a surface active agent characterized by the formula:

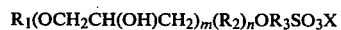

$$R_1(OCH_2CH(OH)CH_2)_m(R_2)_nOR_3SO_3X$$

wherein
  $R_1$ is an alkyl or alkylaryl radical,
  m is an integer of from 1 to 10,
  $R_2$ is an ethoxy radical and/or 1,2-propoxy radical,
  n is an integer of from 0 to 10,
  $R_3$ is an ethylene or 1,3-propylene radical,
  X is a sodium, potassium or ammonium cation;

and driving the fluid through the formation and thereby displacing and recovering petroleum from the formation.

16 Claims, No Drawings

GLYCERYL ETHER SULFONATES FOR USE IN OIL RECOVERY FLUIDS AND PROCESSES

BACKGROUND OF THE INVENTION

1. Field of the Invention

This invention relates to a novel surfactant water flooding enhanced oil recovery process. This invention also relates to a glyceryl ether sulfonate composition of matter. The invention further relates to fluids containing a glyceryl ether sulfonate. The solutions are useful for recovering petroleum in enhanced oil recovery processes.

2. Prior Art

The sequence for recovering petroleum from subterranean petroleum deposits ordinarily comprises a first phase, referred to as primary recovery, in which petroleum is recovered by pumping or permitting the petroleum to flow to the surface of the earth through wells penetrating and in fluid communication with the formation. Once this phase is completed, a secondary production phase is frequently applied. In the secondary phase, water is injected into the formation via an injection well in fluid communication, which displaces petroleum through the formation to another, remotely located well from which petroleum and water flow to the surface of the earth. While waterflooding recovers an additional quantity of oil economically, water does not displace petroleum efficiently, since water and oil are immiscible and the interfacial tension between water and oil is quite high. Accordingly, as much as 70 percent of the oil originally present in the formation is commonly left even after completion of waterflooding operations.

Surfactant waterflooding is a tertiary phase method employed after water flooding recovery is exhausted. The use of surfactant waterflooding has been discussed in many prior art references, and numerous field trials have been undertaken employing surfactant containing fluids. Petroleum sulfonates and other simple organic sulfonate anionic surfactants may be employed in very low salinity formations, but many petroleum formations contain water whose salinity exceeds the level in which petroleum sulfonates may be employed advantageously.

Prior art references suggest the use of surfactants which are both ethoxylated and sulfated or ethoxylated and sulfonated in high salinity environments. Numerous references suggest the injection of a complex mixture of simple anionic surfactants such as petroleum sulfonate and water soluble surfactants such as ethoxylated and sulfated or ethoxylated and sulfonated surfactants. While laboratory tests indicate such complex mixtures effectively displace petroleum in the presence of high salinity water, field application has frequently been disappointing for a number of reasons. One reason for failure of the multi-surfactant containing fluids is related to the different rates of adsorption of the dissimilar surfactants from the aqueous fluid as the fluid passes through the subterranean earth formation. Since optimum performance of a multi-component surfactant system is achieved only when the various surfactant species are present in a critical ratio, differential adsorption necessarily changes the ratio of the surfactants and therefore renders the fluid less effective or completely ineffective for low surface tension displacement of petroleum. The use of essentially single surfactant fluids, in which the surfactant is an ethoxylated and sulfated or ethoxylated and sulfonated surfactant is also suggested in the prior art, but it has heretofore been difficult to compound a fluid containing substantially only one surfactant which is effective under high salinity conditions for recovering oil from subterranean formations.

In view of the serious current shortage of petroleum and shortcomings of the prior art techniques, it can be appreciated that there is a significant need for a surfactant waterflooding oil recovery method employing a fluid containing essentially a single surfactant species which efficiently displaces oil from subterranean formations.

U.S. Pat. Nos. 4,066,124; 4,077,471 and 4,299,711 describe surfactants useful in secondary recovery processes. Surfactants disclosed in these U.S. patents all have hydroxypropyl groups attached to the sulfonate moiety and do not demonstrate the phase modifying characteristics and chemical compatibility of the present invention. U.S. Pat. No. 4,288,334 discloses a surfactant which contains multiple hydroxypropyl groups but no sulfonate moiety and which is not effective in an enhanced oil recovery process when used by itself.

SUMMARY OF THE INVENTION

A process has been discovered for recovering petroleum from subterranean, petroleum containing formations by an aqueous surfactant flooding, enhanced oil recovery process. The process comprises injecting into the formation an aqueous fluid comprising water having dissolved therein an effective amount of a surface active agent. This surface active agent is characterized by the formula:

wherein $R_1$ is a linear or branched alkyl radical or mono- or poly-alkyl substituted benzene radical containing from 8 to 24 carbon atoms; m is an integer of from 1 to 10; $R_2$ is an ethoxy radical, a 1,2-propoxy radical or an ethoxy and 1,2-propoxy radical; n is an integer of from 0 to 10; $R_3$ is an ethylene or 1,3-propylene radical; and X is a sodium, potassium or ammonium cation. The aqueous fluid so specified is driven through the formation and thereby displaces petroleum from the formation and the displaced petroleum is recovered.

DESCRIPTION OF THE PREFERRED EMBODIMENTS

This invention concerns an improved aqueous surfactant flooding, petroleum recovery process suitable for use in high salinity formations, e.g., formations containing water or brine whose salinity is from 20,000 to 240,000 parts per million total dissolved solids, which formation brines frequently also contain high concentration of divalent ions such as calcium and magnesium in the range from 1,000 to 20,000 parts per million. The surfactant fluid is ordinarily compounded to have about the same salinity as the formation water, usually in the range from 50% to 100% and preferably from 75% to 100% of the salinity of the water present in the formation. In one embodiment, the present invention relates to a process for recovering petroleum from a subterranean, petroleum-containing formation penetrated by an injection well and a production well which comprises:

(A) injecting into the formation via the injection well an aqueous fluid comprising water having dissolved therein an effective amount of a surface active agent characterized by the formula:

wherein $R_1$ is a linear or branched alkyl radical or mono- or poly-alkyl substituted benzene radical containing from 8 to 24 carbon atoms; m is an integer of from 1 to 10 and preferrably 2 to 5; $R_2$ is an ethoxy radical, a 1,2-propoxy radical or an ethoxy and 1,2-propoxy radical, n is an integer of from 0 to 10, preferably 2 to 10 and most preferably 3 to 5; $R_3$ is a ethylene radical or a 1,3-propylene radical; and X is a sodium, potassium or ammonium cation; and (B) forcing the fluid through the formation; and (C) recovering petroleum through the protection well.

In one embodiment, $R_1$ is a mono-alkyl substituted benzene radical containing from 12 to 20 carbon atoms. Such compounds are prepared by sulfoalkylation of a series of compounds the preparation of which is found in U.S. Pat. No. 4,288,334 which is incorporated herein in its entirety by reference. In another embodiment, $R_2$ is ethoxy radical. As previously mentioned, the fluid is typically made up in brine solution and particular compatability with brine has been found when X is a sodium cation.

The method of the present invention is distinguished from the prior art in the sulfonated surfactant that is used. This surfactant contains one or more hydroxylpropyl groups in the molecule at position other than attached to the sulfonate moiety. It has been found, surprisingly, that a molecule so formulated reduces adsorptive losses on formation rock from such losses experienced when the hydroxypropyl group is attached to the sulfonate moiety. That is, the molecular formulation of the present invention reduces rock formation adsorption. This is surprising and satisfies a long standing need in the art of enhanced oil recovery utilizing sulfonated surfactants.

It is an essential quality of the present invention and should be noted, that the present class of molecules can achieve repeating hydroxylpropyleneoxy groups while maintaining one sulfonated group per molecule. This is a most desirable characteristic because polysulfonates display excess water solubility and consequently do not lower interfacial tension sufficiently for beneficial use in an enhanced oil recovery process the way the present molecule does. Additionally, mixtures of molecules containing various amounts of sulfonation display very different solubilities and demonstrate chromatographic separation in petroleum-containing formations, which could render them unsuitable in an enhanced oil recovery process. By contrast, the present molecule displays all the previously mentioned benefits of the poly(hydroxypropyleneoxy) moiety while including the beneficial anionic qualities of mono-sulfonation without the fatal qualities of polysulfonation. Thus, it is seen that the fact that the hydroxypropylene group is not attached to the sulfonate moiety is critical and is a contributing factor in the surprisingly good enhanced oil recovery characteristics of the present molecule.

Typically, sulfonated hydroxylpropyl surfactants have had the hydroxypropyl group attached to the sulfonate moiety. The composition of the present invention does not. The composition of matter of the present invention is represented by the formula:

$$R_1(OCH_2CH(OH)CH_2)_m(R_2)_nOR_3SO_3X$$

wherein $R_1$ is a linear or branched alkyl radical or mono- or poly-alkyl substituted benzene radical containing from 8 to 24 carbon atoms and preferably 12 to 20 carbon atoms; m is an integer of from 1 to 10 and preferably, from 2 to 5; $R_2$ is an ethoxy radical, a 1,2-propoxy radical or an ethoxy and a 1,2-propoxy radical; n is an integer of from 0 to 10; $R_3$ is an ethylene radical or a 1,3-propylene radical; and X is a sodium, potassium or ammonium cation.

The composition of matter of the present invention is produced in a three step synthesis expressed by the following sequence:

(1)

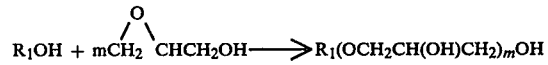

An alcohol which contains $R_1$, a linear or branched alkyl radical or mono- or poly-alkyl substituted benzene radical containing 8 to 24 carbon atoms, is reacted with from 1 to 10 moles of glycidol in an acid or base catalyzed addition.

(2)

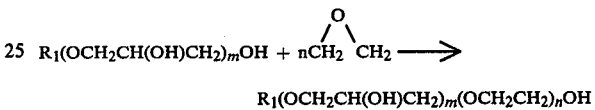

Step (1) is followed by acid or base catalyzed alkoxylation with 0 to 10 moles and preferably 2 to 10 moles of ethylene oxide and/or propylene oxide.

(3) Step (2) is followed by sulfoalkylation of one primary hydroxy group by one of several known processes. These include:

(i) addition of $HOCH_2CH_2SO_3Na$ in the presence of base at elevated temperatures, (ii) addition of vinyl sulfonic acid salts, (iii) addition of allyl chloride in the presence of base followed by $NaHSO_3$ addition to the double bond, (iv) replacement of the —OH group with —Cl using thionyl chloride or hydrochloric acid followed by exchange reaction with $Na_2SO_3$ or other inorganic sulfites in aqueous solution.

Isomeric product variations will arise from alkoxylation reactions occurring at secondary alcohol sites in steps 1 and/or step 2 rather than at primary alcohol sites as represented. These variations give rise in practice to compositions of matter that are mixtures of the essentially linear structure as represented and lesser but substantial amounts of branched isomers. The relative amounts of each isomer depend upon reaction conditions and the ratios.

The product of step 3 will be substantially monsulfonated. Di- or poly-sulfonates can arise in step 3 if there is more than one primary hydroxyl group present in the starting material and/or a large molar excess of sulfoalkylating agent is used.

In summary, the product of the present invention is prepared by the process comprising stepwise addition to an alcohol or alkylphenol of:

(a) 1 to about 10 moles of glycidol, (b) 0 to about 10 moles of ethylene oxide, propylene oxide or a mixture of ethylene oxide and propylene oxide, and (c) a sulfoalkylating agent.

The present invention also relates to fluids. The aqueous brine fluid of the present invention comprises:

(a) about 0.1 wt % to about 2 wt. % of a material of the formula:

$$R_1(OCH_2CH(OH)CH_2)_m(R_2)_nOR_3SO_3X$$

wherein $R_1$ is a linear or branched alkyl radical or mono- or poly-alkyl substituted benzene radical containing from 8 to 24 carbon atoms; m is an integer of from 1 to 10 and preferably 2 to 5; $R_2$ is an ethoxy radical, a 1,2-propoxy radical or an ethoxy and 1,2-propoxy radical; n is an integer of from 0 to 10 preferrably 2 to 10 and most preferably 3 to 5; $R_3$ is an ethylene or 1,3-propylene radical; and X is a sodium, potassium or ammonium cation; and (b) about 0.1 wt. % to about 4 wt. % of a petroleum sulfonate.

Petroleum sulfonates are a particularly desirable surfactant for oil recovery purposes because they are readily available, comparatively inexpensive and quite effective under certain conditions for recovering petroleum from subterranean, petroleum-containing formations. Petroleum sulfonates are, unfortunately, generally insoluble in water having salinities greater than about 5,000 parts per million total dissolved solids, and/or more than about 500 parts per million divalent ions which are generally calcium and/or magnesium. If a normally water soluble petroleum sulfonate is added to a brine having greater salinity and/or divalent ion concentration than the above-identified limits, the petroleum sulfonate is insoluble and will precipitate and ultimately settle out of the solution, forming a separate layer. If such a fluid were injected into a subterranean, permeable oil formation, little interfacial tension reduction would be accomplished because the petroleum sulfonate is not soluble in the aqueous fluid in which it is injected; moreover, there is a considerable probability that plugging of at least some of the small capillary flow channels in the oil formation would occur. Accordingly, the glyceryl ether sulfonate of the present invention must be added to the surfactant fluid, which has the effect of increasing the solubility of the petroleum sulfonate in the presence of the mono- and divalent ion-containing water.

The various materials available under the general name of petroleum sulfonates vary in composition according to the petroleum fraction used for sulfonation and in the degree of sulfonation imparted to the petroleum fraction. Preferably petroleum sulfonates are those prepared from a petroleum fraction whose boiling range is from 700° F. to 1100° F. which corresponds to a molecular weight range of from about 350 to about 500. The sodium salt of the sulfonation product of this petroleum fraction is an excellent material for use in the subject invention. The potassium and ammonium salts are also useful.

Mixtures of petroleum sulfonates can also be employed as the sulfonate component of this invention. For example, a mixture of a predominantly water soluble petroleum sulfonate having an average equivalent weight of less than 400 and preferably less than 350 may be utilized along with a second petroleum sulfonate which is at least partially oil soluble and preferably part oil soluble and part water soluble and having an average equivalent weight of about 400 to about 600 and preferably about 450 to about 550.

It has been found that the degree of solubility of the surfactant composition in the field water is extremely critical to the oil recovery efficiency in the process. If the surfactant is much more soluble in water than oil, then the surfactant tends to be distributed throughout the bulk of the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive water and/or formation water, so the surfactants tend to exist in higher concentrations at the interfacial zone between oil and water than in either the oil phase or the water phase.

It has been found that when using blends of petroleum sulfonates and the glyceryl ether sulfonate of the present invention, optimum oil recovery efficiency occurs when the concentrations of the materials are carefully balanced so as to produce a condition of borderline solubility. If too little solubilizing co-surfactant is used in combination with the primary surfactants, they are rendered insoluble and at least a portion thereof will precipitate in the aqueous solution. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the minimum amount of glyceryl ether sulfonate which achieves the conditions which we have described above as borderline solubility is used in combination with petroleum sulfonate, the surfactants are rendered too soluble in the aqueous phase and the amount of oil displaced by such a solution being injected into a formation is reduced fairly substantially. Moreover, since the cost of the glyceryl ether sulfonate is high compared to that of petroleum sulfonate, the result of using too much glyceryl ether sulfonate is that the fluid cost is increased and the amount of oil recovered by the use of the fluid is decreased, with rapidly diminishing economic attractiveness of the process.

The amount of glyceryl ether sulfonate necessary to achieve the above-described desired condition of borderline solubility is highly dependent on all of the possible variations in the structural characteristics of the surfactant molecules employed. The average equivalent weight of the petroleum sulfonate, for example, will affect the amount of glyceryl ether sulfonate required to achieve the condition of borderline solubility. For example, any change in the length of the alkyl chain which comprises the hydrophobe of the surfactant molecule, or a change in the number of ethylene oxide or glyeryl groups condensed with the molecule, will change the amount of glyceryl ether sulfonate needed to achieve the condition of borderline solubility with whatever primary anionic surfactant or mixture thereof it is used. Furthermore, the aqueous fluid salinity and the concentration of divalent ions present in the fluid will also influence the amount of the surfactants needed to achieve borderline solubility. Generally, higher salinity and/or higher concentrations of divalent ions of the aqueous fluid in which the surfactants are dissolved require increasing number of ethylene oxide and/or glyceryl units to be present on the glyceryl ether sulfonate.

It has been found that one satisfactory method for determining the proper concentrations of petroleum sulfonate and glyceryl ether sulfonate is found in U.S. Pat. No. 4,066,124 which is incorporated herein in its entirety by reference. By this method it has been found that brine solutions of about 0.1 wt. %, to about 4 wt. % of a petroleum sulfonate herein defined produce advantageous results in an enhanced oil recovery process. These advantageous results include salinity tolerance, phase stability and reduced intermolecular antagonism.

When made up these fluids are typically solutions. However, the present invention is intended to include fluids which are micellar dispersions as well.

This invention is more fully illustrated by the following Examples.

EXAMPLE I

Glycidol (76 g.) was added over 22 minutes to a solution of 1.5 g potassium hydroxide in 262 g dodecylphenol (previously stripped at 100° C. for 45 minutes in a stream of nitrogen to remove $H_2O$ present) kept at 120°–130° C. The mixture was digested at 122° C. for 55 minutes. The product was identified as the monoglyceryl ether of dodecylphenol by hydroxyl number analysis.

A mixture of 252 g of the above ether and 2 g potassium hydroxide was stripped at 100° C. for 1 hour in a nitrogen stream in a stirred autoclave followed by addition of 116 g ethylene oxide at 120° C. Hydroxyl number analysis of the resulting product indicated a 3.2-molar ethoxylate.

A one-liter resin flask was charged with 378 grams of the ethoxylate and 1 g potassium hydroxide. The mixture was heated to 180° C. with stirring at 30 mm Hg pressure in the presence of a nitrogen purge to aid in water removal. A 56% aqueous solution containing 208 g of $HOCH_2CH_2SO_3Na$ was introduced to the flask under these reaction conditions over a two-hour period followed by digestion for an additional 225 minutes under the same conditions.

The reaction mixture was dissolved in 500 g water and extracted with $3 \times 1000$ g ethyl acetate to remove unreacted nonionics (152 g was recovered upon stripping extracts). The aqueous layer was distilled to remove residual ethyl acetate, leaving 606 grams of a product solution containing (by antagonistic titration) 35.4 weight percent of dodecylphenoxyglyceryl-3.2 molar ethoxy-ethane sulfonic acid, sodium salt.

EXAMPLE II

The general method of Example I was used to prepare triglyceryl ether of nonylphenol by treating 220 g of the latter with 222 g glycidol. This ether (381 g) and 1 g potassium hydroxide were treated with 150 g 56% $HOCH_2CH_2SO_3Na$ solution using the conditions described in Example I for such an addition. The crude product was dissolved in 500 g $H_2O$ and extracted with $1 \times 2000$ g and $3 \times 1000$ g ethyl acetate to leave, after distillation of residual ethyl acetate, 309 g of an aqueous gel containing 18.9% organic sulfonate by titration.

EXAMPLE III

In a field in which the primary production has already been exhausted, an injection well is completed in the hydrocabon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step, oil field brine of 1000 ppm hardness at a temperature of 75° F. containing dissolved therein 1% by weight petroleum sulfonate and 0.5% by weight of the product of Example I is injected via the injection well into the formation at a pressure of about 1300 psig and at the rate of 1.05 barrels per minute. Injection of the driving fluid continues at the rate of 1.05 barrels per minute and at the end of 67 days, a substantial production of petroleum is achieved.

What is claimed is:

1. A process for recovering petroleum from a subterranean, petroleum-containing formation penetrated by an injection well and a production well which comprises:
   (A) injecting into the formation via the injection well an aqueous fluid comprising water having dissolved therein an effective amount of a surface active agent characterized by the formula:

wherein $R_1$ is a linear or branched alkyl radical or mono- or poly-alkyl substituted benzene radical containing from 8 to 24 carbon atoms; m is an integer of from 1 to 10; $R_2$ is an ethoxy radical, a 1,2-propoxy radical or an ethoxy and 1,2-propoxy radical; n is an integer of from 0 to 10; $R_3$ is an ethylene or 1,3-propylene radical; and X is a sodium, potassium or ammonium cation; and
   (B) forcing the fluid through the formation; and
   (C) recovering petroleum through the production well.

2. The process of claim 1 wherein $R_1$ is a mono-alkyl substituted benzene radical containing from 12 to 20 carbon atoms.

3. The process of claim 1 wherein m is an integer of from 2 to 5.

4. The process of claim 1 wherein $R_2$ is an ethoxy radical.

5. The process of claim 1 wherein n is an integer of from 2 to 10.

6. The process of claim 1 where n is an integer of from 3 to 5.

7. The process of claim 1 wherein X is a sodium cation.

8. The process of claim 1 wherein the fluid contains brine.

9. An aqueous brine fluid comprising:
   (a) about 0.1 wt. % to about 2 wt. % of a material of the formula:

wherein
   $R_1$ is a linear or branched alkyl radical or mono- or poly-alkyl substituted benzene radical containing from 8 to 24 carbon atoms;
   m is an integer of from 1 to 10;
   $R_2$ is an ethoxy radical, a 1,2-propoxy radical or an ethoxy and 1,2-propoxy radical;
   n is an integer of from 0 to 10;
   $R_3$ is an ethylene or 1,3-propylene radical, and X is a sodium, potassium or ammonium cation; and (b) about 0.1 wt. % to about 4 wt. % of a petroleum sulfonate.

10. The fluid of claim 9 wherein $R_1$ is a mono-alkyl substituted benzene radical containing from 12 to 20 carbon atoms.

11. The fluid of claim 9 wherein m is an integer of from 2 to 5.

12. The fluid of claim 9 wherein $R_2$ is an ethoxy radical.

13. The fluid of claim 9 wherein n is an integer of from 2 to 10.

14. The fluid of claim 9 wherein n is an integer of from 3 to 5.

15. The fluid of claim 9 wherein X is a sodium cation.

16. The fluid of claim 9 wherein the petroleum sulfonate has a molecule weight in the range of about 350 to about 500.

* * * * *